United States Patent Office 3,649,536
Patented Mar. 14, 1972

3,649,536
SYNERGISTIC COMPOSITION AND USE THEREOF
Edwin J. Latos, Chicago, and Robert H. Rosenwald, Western Springs, Ill., assignors to Universal Oil Products Company, Des Plaines, Ill.
No Drawing. Continuation-in-part of application Ser. No. 591,990, Nov. 4, 1966. This application Jan. 30, 1970, Ser. No. 7,209
Int. Cl. C10m 1/46
U.S. Cl. 252—32.5     11 Claims

ABSTRACT OF THE DISCLOSURE

Synergistic mixture of (1) the reaction product of from one to two mole proportions of amino compound and one mole proportion of polyhalopolyhydropolycyclicdicarboxylic acid or anhydride and (2) salt of acid orthophosphate and amino compound. The composition is used as an additive to organic substrates and particularly in lubricating oils.

CROSS REFERENCE TO RELATED APPLICATIONS

This is a continuation-in-part of application Ser. No. 591,990, filed Nov. 4, 1966 and now abandoned.

BACKGROUND OF THE INVENTION

Heretofore, it has been demonstrated by one of the present applicants and others associated with him that the reaction products of polyhalopolyhydropolycyclicdicarboxylic acid or derivatives thereof with certain amino compounds possess desirable properties as additives to organic substrates and particularly in lubricating oils. It also has been demonstrated that phosphate salts of such reaction products also were extremely effective as additives for such use.

DESCRIPTION OF THE INVENTION

The present invention is based on the discovery by the present applicants that mixtu res of the reaction products and of certain phosphate salts are very effective additives for use in organic substrates and particularly in lubricating oils. These mixtures appear to offer improved properties in special applications.

The mixture produces a synergistic effect as is demonstrated in Examples X and XI of the present application, in which a direct comparison is made when using a specified concentration of each component separately and when using the same total amount of additive consisting of a mixture of the two components. As is shown in these examples, a higher operating load was obtained before seizure. This increase in load is a surprising discovery and would not normally be expected.

In one embodiment the present invention relates to a synergistic mixture of (1) reaction product of from one to two mole proportions of amino compound and one mole proportion polyhalopolyhydropolycyclicdicarboxylic acid or anhydride and (2) salt of phosphorus compound and amino compound.

In a specific embodiment, the polyhalopolyhydropolycyclicdicarboxylic acid or anhydride is 5,6,7,8,9,9-hexacholo - 1,2,3,4,4a,5,8,8a - octahydro - 5,8 - methano-2,3-naphthylenedicarboxylic acid or anhydride and the amino compound is a long chain alkyl monoamine containing from about 8 to about 26 carbon atoms in said alkyl and from about 2 to about 6 carbon atoms in said alkane.

In another embodiment, the present invention relates to the use of the above mixture as an additive in organic substrates and particularly in lubricating oil.

As hereinbefore set forth, a preferred reactant used in preparing the reaction product for use in the mixture of the present invention is 5,6,7,8,9,9 - hexachloro-1,2,3, 4,4a,5,8,8a - octahydro - 5,8 - methano - 2,3-naphthylenedicarboxylic acid or anhydride, the latter also referred to herein as "A" anhydride. This acid as well as other acids which may be used, but not necessarily with equivalent results, may be illustrated by the following general formula

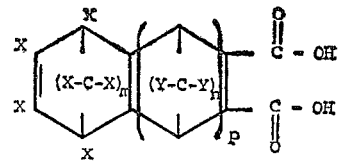

in which X is selected from the group consisting of halogen and particularly chlorine and/or bromine, hydrogen and an alkyl radical of from one to ten and preferably from one to four carbon atoms, at least two of the X's being halogen, Y is selected from the group consisting of halogen, hydrogen and an alkyl radical of one to ten and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not illustrated, but is readily ascertainable from the above structure. As hereinbefore set forth, a particularly preferred acidic compound is 5,6,7,8,9,9-hexachloro-1,2, 3,4,4a,5,8,8a - octahydro - 5,8 - methano - 2,3-naphthalenedicarboxylic acid. Other preferred acidic compounds include 5,6,7,8,9,9 - hexachloro - 1,2,3,4,4a,5,8,8a-octahydro - 1,4,5,8 - dimethano - 2,3 - naphthalenedicarboxylic acid - 1,4,5,6,7,7 - hexachlorodicyclo - (2.2.1)-5-heptene-2,3 - dicarboxylic acid, and the corresponding anhydrides.

While the acid or anhydride set forth above is preferred, it is understood that an ester of the acid may be used. Any suitable ester may be used and is prepared by reacting the acid with an alcohol under conditions to liberate water. While the alcohol may contain from one to eighteen carbon atoms, it preferably contains one to four carbon atoms. Illustrative alcohols include methanol, ethanol, propanol, butanol, pentanol, hexanol, etc.

Another reactant used in preparing the mixture of the present invention is an amino compound. An amino compound is used to prepare each of the components of the mixture and the amino compound used in each of the steps may be of the same chemical composition or of different chemical composition but will be selected from the following.

(1) Monoamine containing from about 8 to about 26 carbon atoms and is referred to herein as a long chain alkyl monoamine. The monoamine may be a primary, secondary or tertiary-alkyl amine and preferably is a primary or secondary - alkyl amine. Preferred monoamines include octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine, pentacosylamine and hexacosylamine. The amines conveniently are prepared from fatty acid derivatives and may comprise, for example, tallow amine, hydrogenated tallow amine, lauryl amine, stearyl amine, oleyl amine, linoleyl amine, soya amine, coconut amine, etc. Also included are the beta-alkyl amines, also referred to as beta-amines, in which the nitrogen atom is attached to the beta or second carbon atom of the alkyl group.

(2) N-alkyldiaminoalkanes containing from about 8 to about 26 carbon atoms in said alkyl and from about 2 to about 6 carbon atoms in said alkane. Included particularly are the N-alkyl-1,3-diaminopropanes in which the alkyl group contains from about 8 to about 26 carbon atoms. These N- alkyl-1,3-diaminopropanes include N-octyl-1,3-diaminopropane,
N-nonyl-1,3-diaminopropane,
N-decyl-1,3-diaminopropane,
N-undecyl-1,3-diaminopropane,
N-dodecyl-1,3-diaminopropane,
N-tridecyl-1,3-diaminopropane,
N-tetradecyl-1,3-diaminopropane,
N-pentadecyl-1,3-diaminopropane,
N-hexadecyl-1,3-diaminopropane,
N-heptadecyl-1,3-diaminopropane,
N-octadecyl-1,3-diaminopropane,
N-nonadecyl-1,3-diaminopropane,
N-eicosyl-1,3-diaminopropane,
N-heneicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane and
N-hexacosyl-1,3-diaminopropane.

Included particularly are the N-alkyl-1,3-diaminopropanes in which the alkyl group is derived from tallow and are available commercially as "Duomeen T" and "Diam 26." These commercial diamines comprise a mixture in which the alkyl predominates in 16 to 18 carbon atom groups. Also included are the correspondingly substituted diaminoethanes, diaminopropanes, diaminobutanes, diaminopentanes and diaminohexanes.

Other diaminoalkanes are the beta-alkyldiamines, in which at least one alkyl group is attached to a nitrogen atom at the beta or second carbon atom of the alkyl group. Such an amine is available commercially under the tradename of "Duomeen L–15" and is a N-beta-alkylpropylenediamine in which the alkyl group contains 17 carbon atoms. This compound also may be named N-1-methyl-heptadecylpropylenediamine. It is understood that other beta-alkyldiamines may be employed and will comprise N-1-methyl-alkyl-alkylenediamine in which the alkyl moiety, exclusive of the methyl group, contains from about 7 to about 25 carbon atoms which means that the total number of carbon atoms in the alkyl group contains from about 8 to about 26 carbon atoms.

As hereinbefore set forth, the mixture of the present invention includes a salt of a phosphorus compound and an amino compound. In a particularly preferred embodiment the phosphorus compound is an alkyl acid orthophosphate, including the monoalkyl ester, dialkyl ester or mixtures thereof and preferably contains at least one alkyl group of at least 6 carbon atoms and more particularly of from 6 to about 20 or more carbon atoms. Illustrative perferred acid orthophosphates include monohexyl acid orthophosphate, dihexyl acid orthophosphate, mixture of mono and dihexyl acid orthophosphates, monoheptyl acid orthophosphate, diheptyl acid orthophosphate, mixture of mono and diheptyl acid orthophosphates, monooctyl acid orthophosphate, dioctyl acid orthophosphate, mixture of mono- and dioctyl acid orthophosphates, monononyl acid orthophosphate, dinonyl acid orthophosphate, mixture of mono and dinonyl acid orthophosphates, monodecyl acid orthophophate, didecyl acid orthophosphate, mixture of mono and didecyl acid orthophosphates, monoundecyl acid orthophosphate, diundecyl acid orthophosphate, mixture of mono- and diundecyl acid orthophosphate, monododecyl acid orthophosphate, didodecyl acid orthophosphates, mixture of mono- and didodecyl acid orthophosphates, monotridecyl acid orthophosphate, ditridecyl acid orthophosphate, mixture of mono- and ditridecyl acid orthophosphates, monotetradecyl acid orthophosphate, ditetradecyl acid orthophosphate, mixture of mono- and ditetradecyl acid orthophosphates, monopentadecyl acid orthophosphate, dipentadecyl acid orthophosphate, mixture of mono- and dipentadecyl acid orthophosphate, monohexadecyl acid orthophosphate, dihexadecyl acid orthophosphate, mixture of mono- and dihexadecyl acid orthophosphates, monoheptadecyl acid orthophosphate, diheptadecyl acid orthophosphate, mixture of mono and diheptadecyl acid orthophosphates, monooctadecyl acid orthophosphate, dioctadecyl acid orthophosphates, mixture of mono and dioctadecyl acid orthophosphates, monodecyl acid orthophosphate, dinonadecyl acid orthophosphate, mixture of mono and dinonadecyl acid orthophosphates, manoeicosyl acid orthophosphate, dieicosyl acid orthophosphate, mixture of mono- and dieicosyl acid orthophosphates, etc. It is understood that a mixture of the phosphates having alkyl groups of different chain lengths may be employed.

As hereinbefore set forth, one component of the mixture of the present invention is the reaction product of the polycyclic acid or anhydride with the amino compound, both being selected from those hereinbefore set forth. The reaction product is prepared in any suitable manner and will depend upon whether the reaction product is to be a salt, prepared without the liberation of water, or an imide, amide, imide-amine, amide-amine or ester, prepared with the liberation of water. When preparing the salt, mild conditions are employed to avoid the liberation of water. The salt may be either the mono or half salt or the double salt. When the mono or half salt is desired, the reactants are reacted in an equal mole proportion of acid and amine. When the double salt is desired, the reactants are reacted in a proportion of 1 mole of acid and 2 moles of amine. As hereinbefore set forth, the salt is prepared under mild conditions and conveniently by intimately mixing the reactants at ambient temperature (about 10° to about 32° C.), although an elevated temperature which generally will not exceed from about 70° C. may be employed, particularly when the reaction is effected under superatmospheric pressure which may range from 5 to 500 p.s.i. or more. The time of mixing will be sufficient to effect substantially complete reaction and may vary from about 0.25 to 12 hours or more. A solvent preferably is used and conveniently comprises an aromatic hydrocarbon including benzene, toluene, xylene, ethylbenzene, cumene or mixture thereof. Other solvents include paraffinic hydrocarbons, ethers, etc.

When the reaction is to be effected with the liberation of water, the reactants are reacted in a ratio of 1 mole proportion of the acid or derivative thereof and from 1 to 2 mole proportions of the amino compound. When an imide is to be formed, the anhydride preferably is used. When an amide is to be formed, the acid preferably is used. When an ester is to be formed, the acid or anhydried is used. The reaction with the liberation of water conveniently is prepared by first forming solutions in suitable solvent of one or both of the reactants, commingling the reactants and heating the mixture under refluxing conditions. The refluxing temperature generally will range from about 80° to about 280° C. and the pressure will range from about 5 to 500 p.s.i. or more, with the time of refluxing being within the range of from about 0.5 to 12 hours or more. The water formed during the reaction preferably is continuously removed from the reaction zone. When the N-alkyldiaminoalkane and the anhydride are used as reactants and the reaction mixture is refluxed as above described, it is believed that the reaction product is an imide-amine.

The reaction product formed in the above manner comprises one component of the novel composition of the present invention. The second component of the mixture is the salt of a phosphorus compound and an amino compound. As hereinbefore set forth, the amino compound will be selected from those hereinbefore specifically set forth, as also will be the phosphorus compound. The salt is prepared in any suitable manner and conveniently by mixing the amino compound and the phosphorus compound at ambient temperature or an elevated temperature which generally will not exceed about 70° C. The mixing may be effected at atmospheric pressure or, when desired, superatmospheric pressure in the range of from about 5 to about 100 p.s.i.g. or more. The time of mixing will range from a fraction of an hour to 24 hours or more and generally from about ¼ to about 4 hours. When desired, the phosphorus-containing compound may be prepared as a solution in a suitable solvent and then commingled with the amino compound. Conveniently the solvent will be the same as used in the other step of the process.

In general, the neutral salt of the phosphorus compound and amino compound is preferred. The neutral salt is prepared by using stoichiometric equivalents of the amino groups and of the acid groups. Thus, the specific concentrations of reactants will depend upon whether the orthophosphate salt or pyrophosphate salt is to be prepared and whether a monoamine compound or a polyamino compound is used. The basic salt is prepared by utilizing a deficiency of acidic equivalents and similarly the acid salt is prepared by using a deficiency of basic equivalents. The proportions of reactants used in preparing the salt may range from about 0.1 to 1 basic equivalent per one acidic equivalent or from about 0.1 to 1 acidic equivalent per 1 basic equivalent and preferably from 0.25 to 1 equivalent of one component per 1 equivalent of the other component.

The reaction product and the salt may be each recovered in the presence of a solvent and used in this manner to form the mixture of the present invention or, when desired, the solvent may be removed from one or both of the components in any suitable manner. When the product is recovered in the absence of a solvent, a solvent may be incorporated in the mixture to improve solubility of the mixture in the substrate. Particularly suitable solvents for this purpose include alkylphenols and polyalkylphenols in which the alkyl group or groups contain from 6 to 20 carbon atoms each. The phenol may be used in a concentration of 5% and preferably from 20% to 200% by weight of the active components of the mixture.

The reaction product and the salt will be used in any suitable proportions. While these may be expressed as mole proportions, advantages appear to express these proportions, advantages appear to express these proportions as the ratio of halogen and particularly chlorine to phosphorus in the final mixture. It will be noted that the specific acids hereinbefore set forth contain 6 chlorines per molecule. When expressed in this manner, the reaction product and salt may be used in a halogen and particularly chlorine to phosphorus ratio of from 0.1 to about 300 and preferably of from about 12 to about 100.

As hereinbefore set forth, the mixture of the present invention is particularly advantageous for use in lubricating oil and particularly in lubricating oil which must meet severe requirements. It will be noted that the mixture of the present invention contains halogen, nitrogen and phosphorus in one embodiment and also sulfur in another embodiment. Experience has shown that compounds containing these elements are especially advantageous for use in lubricating oils subject to severe conditions. However, while the reaction mixture of the present invention is especially useful in such lubricating oils, it is understood that is also is used to advantage in other lubricating oils. Another advantage of the compositions of the present invention is that certain of these compositions will not cause darkening of the oil during use.

The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methylsilicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylolhexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts or higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rollings, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

While the mixture of the present invention is particularly advantageous in substrates subjected to high temperatures, it is understood that it may be used in other substrates which deteriorate in storage, during treatment and/or in use. These other substrates include motor fuels such as unsaturated gasoline, blends or unsaturated and saturated gasolines, etc., jet fuel, diesel oil, fuel oil, residual oil, drying oil, rubber, polyolefins, resins, waves, etc.

The mixture of the present invention is used as an additive in lubricating oil in a small but stabilizing concentration. Depending upon the particular use, the additive may be employed in a concentration of from about 0.01% to about 25% and preferably from about 0.05% to about 10% by weight of the oil. These and the following concentrations are on the basis of the active constituent and do not include the solvent or solubilizing phenol when used. When used in conventional lubricating oil, the additive generally is employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to about 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight or more of the oil.

It is understood that the mixture of the present invention may be used along with other additives incorporated in the oil for specific purposes. In most cases, it is desirable to also incorporate an additional antioxidant in the oil. Preferred additional antioxidants are of the phenolic type and include tertiarybutylcatechol, 2,6-ditertiarybutyl-4-methylphenol, 2,4-dimethyl-6-tertiarybutylphenol, etc., 2-tertiarybutyl-4-methoxyphenol, 2-tertiarybutyl-4-ethoxyphenol, etc. Also, other additives incorporated in lubricating oil include metal deactivator, dye, viscosity index improver, pour point depressor, anti-foaming additive, detergent, etc. In some case, particularly when used with the additional antioxidants set forth above, a synergistic effect is obtained and thus an even greater improvement in the properties of the substrate is obtained.

While the mixture of the present invention is particularly useful in lubricating compositions, it also possesses insecticidal properties and may be used for this purpose. Furthermore, the mixtures also possess flame proofing or flame retardant properties and therefore are useful in plastic coatings, paints, drying oils, etc., as well as in fibrous materials. For example, in textiles, the mixture imparts flame retardant as well as fungicidal properties to the fabric.

The following examples are introduced to illustrate further the novelty and untility of the present invention but not with the intention of unduly limiting the same.

EXAMPLE I

A number of different mixtures having the components in different proportions were prepared. The reaction product and the phosphorus salt each were prepared separately and then commingled to form mixtures containing these components in different proportions.

The reaction product was prepared by first adding about 4000 g. of toluene to a reactor and then slowly adding thereto, with stirring, 1700 g. (4 mole) of 5,6,7,8,9,9-hexachloro - 1,2,3,4,4a,5,8,8a-octahydro-5,8-methano-2,3-naphthylenedicarboxylic anhydride, after which 1070 g. (4 mole) of oleylamine were added with stirring. The mixture then was subjected to refluxing and a total of 79 cc. of water was collected. The reaction mixture was allowed to cool and then treated with potassium carbonate. The resultant imide was recovered as a viscous amber oil and was analyzed and found to have a bromine number of 23.5, which corresponds to the theoretical bromine number of 23.8, a total nitrogen content of 1.97% which corresponds to the theoretical of 2.08%, a total chlorine content of 32.1% which corresponds to the theoretical of 31.75% and a molecular weight of 630 which corresponds to the theoretical of 671.

The phosphorus salt was prepared by mixing at room temperature 268 g. (1 equivalent weight) of oleylamine and 370 g. (1 equivalent weight) of mixed mono and ditridecyl acid orthophosphates. The mixture then was allowed to stand on a steam bath and mixed further to recover the salt as a clear, amber, viscous fluid.

As hereinbefore set forth, the reaction product and the salt were mixed in different proportions to form different mixtures. Separate mixtures were prepared to have the following chlorine:phosphorus ratios: 6:1, 12:1 and 24:1. Each of thse mixtures was recovered as a dark, amber, viscous liquid.

EXAMPLE II

The mixture of this example was prepared from (1) reaction product prepared in substantially the same manner as described in Example I by reacting the anhydride with oleylamine and (2) the salt of mixed mono and ditridecyl acid orthophosphate and N-tallow-1,3-diaminopropane. The N-tallow-1,3-diaminopropane used in this example is available commercially as "Diam 26" and contains predominantly 16 to 18 carbon atoms in the tallow group.

The reaction product was prepared in substantially the same manner as described in Example I except that a larger batch was prepared. In this preparation 4250 g. (10 moles) of the anhydride were commingled with 6 liters of toluene and then 2860 g. (10 moles) of oleylamine were added with mixing, after which the mixture was refluxed and 181 g. of water were recovered. The reaction mixture was treated with potassium carbonate, filtered and evaporated at 3-4 mm. Hg to recover 6627 g. of a fluid product having a molecular weight of 638, which corresponds to the theoretical molecular weight of 671, and a total chlorine content of 30.93 which corresponds to the theoretical chlorine content of 31.75%.

The salt was prepared by mixing at room temperature 1666 g. (1 equivalent) of the N-tallow-1,3-diaminopropane and 370 g. (1 equivalent) of mixed mono and ditridecyl acid orthophosphates, following which the mixture was heated on a steam bath and further mixed. The salt was recovered as a clear, amber, viscous liquid. The above components were mixed to give different mixtures having chlorine:phosphorus ratios of 12:1, 24:1, 48:1 and 60:1.

EXAMPLE III

A mixture is prepared by first forming the reaction product using the anhydride described in Example 1 with N-alkyl - 1,3 - diaminopropane in which the alkyl contains 18 carbon atoms. This amine is available commercially under the tradename "Duomeen L-15" and is a beta-alkyl diamine. The reaction product is prepared by refluxing at a temperature up to 120° C. 1700 g. (4 mole) of "A" anhydride, 1500 g. (4 moles plus 10% excess) of Duomeen L-15 and 3000 g. of toluene. Approximately 92 ml. of water is removed during the refluxing which is continued until no more water is liberated. The reaction mixture is treated with anhydrous potassium carbonate and filtered. A 100 g. sample of the reaction mixture is distilled to remove the solvent. The solvent-free product is a light amber oil having a basic nitrogen equivalent of 1.50 mg./g. which corresponds to the theoretical basic nitrogen equivalent of 1.515.

The salt used in this example is prepared by mixing at room temperature 830 g. (5 equivalent weights) of N-tallow-1,3-diaminopropane and 1300 g. (5 equivalent weights) of mixed mono and dioctyl acid orthophosphates. The components are mixed at room temperature and warmed on a steam bath and further mixed.

The reaction product and salt then are commingled in proportions to form mixtures having chlorine:phosphorus ratios of 6:1, 12:1, 18:1, 24:1 30:1, 36:1, 42:1, 48:1 and 54:1.

EXAMPLE IV

The mixture of this example includes as one component, the reaction product prepared as described in Example I, except that stearyl amine is used instead of oleyl amine and, as the other component, the salt is formed by the reaction of mixed mono- and dioctyl acid orthophosphates and stearyl amine. The components are commingled to form a mixture having a chlorine-phosphorus ratio of 24:1.

EXAMPLE V

The mixture of this example includes, as one component, the reaction product formed by reacting one mole proportion of 5,6,7,8,9,9 - hexabromo - 1,2,3,4,4a,5,8,8a-octahydro - 1,4,5,8 - dimethano-2,3-naphthalenedicarboxylic anhydride with one mole proportion of beta-diamine available commercially under the tradename of "Duomeen L-15" and comprising N-1-methyl-heptadecylpropylenediamine. The other component of the mixture is a salt prepared by reacting N-1-methyl-heptadecylpropylenediamine with mixed mono and didecyl acid orthophosphates. The reaction product and the salt then are commingled to form a mixture having a bromine:phosphorus ratio of 36:1.

metal trough in which the pin and bearings are partly submerged. The machine was operated for 5 minutes each at 250, 500, 750, 1000 pound loads and for 45 minutes at 1250 pound load. The data collected includes the temperature of the oil at each of the loads and the torque in pounds per square inch at each load, as well as the wear which is determined at a ratchet wheel arrangement in which the teeth are advanced in order to maintain the desired load. Each tooth is equivalent to approximately 0.000022 inch. Preferred additives are those which impart low temperature, low torque and low wear to the oil. The lubricating oil used in this example is a commercial lubricating oil having a S.A.E. rating of 90 which was obtained free of additives.

In another method the machine was operated for five minutes at each load from 250 pounds to seizure at 250 pound increments. The maximum load and the time in minutes at this load to seizure are reported, as well as the temperature of the oil. In this case, the higher temperature is preferred because it means that the oil is operating satisfactorily at a higher temperature.

Run No. 1 in the following table is a run made using the lubricating oil not containing an additive and thus is the blank or control run.

Run No. 2 is a run made using the mixture prepared as described in Example I having a chlorine:phosphorus ratio of 12:1. The mixture was used in the total additive concentration of 5% by weight and consisted of 3.38% by weight of the reaction product and 1.62% by weight of the salt.

Run No. 3 is a run made using the mixture prepared as described in Example I having a chlorine: phosphorus ratio of 24:1. The mixture again was used in a total additive concentration of 5% by weight and consisted of 4.04% by weight of the reaction product and 0.96% by weight of the salt.

Run No. 4 is a run made using the mixture as prepared in Example I having a chlorine:phosphorus ratio of 24:1. The mixture was used in a total additive concentration of 10% by weight and consisted of 8.07% by weight of the reaction product and 1.93% by weight of the salt.

TABLE I

| Run No. | Temperature, °F. | | | | | Torque, lbs. | | | | | Wear, teeth | | | | | Total time at 1,250 lbs., mins. | Temperature °F. |
|---|---|---|---|---|---|---|---|---|---|---|---|---|---|---|---|---|---|
| | 250 | 500 | 750 | 1,000 | 1,250 | 250 | 500 | 750 | 1,000 | 1,250 | 250 | 500 | 750 | 1,000 | 1,250 | | |
| 1 | 177 | 230-S | | | | 6-7 | S | | | | 0 | 0-S | | | | | |
| 2 | 175 | 245 | 316 | 363 | 491 | 5-6 | 11-17 | 16-18 | 20-22 | 23-30 | 0 | 3 | 0 | 1 | 34 | 45 | 491 |
| 3 | 175 | 250 | 317 | 358 | 617 | 6-7 | 15-16 | 16-20 | 19-21 | 22-110 | 0 | 5 | 3 | 7 | 46 | 45 | 617 |
| 4 | 186 | 252 | 333 | 367 | 548 | 5-6 | 9-13 | 14-16 | 16-19 | 19-31 | 0 | 2 | 1 | 3 | 32 | 45 | 548 |

NOTE.—S=Seizure.

EXAMPLE VI

As hereinbefore set forth the salt of the present invention is of especial utility in substrates encountering high temperatures during use. An example of such a substrate is lubricating oil and especially such oil used in the lubrication of hypoid gears which must meet severe requirements of high torque-low speed, low torque-high speed and high torque-high speed conditions. The requirements are even more severe because such oils must retain their lubricity properties for long periods of time as exemplified, for example, by the recommendation of not changing oil for one year or more or 20,000 miles or more of operation and even up to 100,000 miles or for the life of the vehicle.

One method of evaluating E.P. (extreme pressure) lubricating oils is by the Falex machine. This procedure is described in detail in a book entitled "Lubricant Testing" authored by E. G. Ellis and published by Scientific Publications (Great Britain) Limited, 1953, pages 150-154. Briefly, the Falex machine consists of a rotating pin which runs between two V shape bearings which are spring loaded against the pin and provided with means for varying the load. The oil to be tested is poured into a From the data in the above table, it will be seen that the lubricating oil without additive (Run No. 1) underwent seizure at a load of about 500 pounds. In contrast, the runs made with the lubricating oil containing the mixtures of the present invention all performed effectively at 1250 pounds for the full duration of the 45 minutes evaluation.

EXAMPLE VII

The mixtures prepared as described in Example II also were evaluated in the same manner as described in Example VI. However, the lubricating oil used in this example is a mixture of commercial lubricating oils free of additives blended to an S.A.E. rating of 90.

Also of importance in this series of evaluations is the fact the new pins and bearings were received from the manufacturer. In making these evaluations with the new pins and bearings, it was found that the evaluations made at 1100 pounds were equivalent to those made with the earlier pins and bearings at 1250 pounds which, it will be noted, are the data presented in Example VI of the present specifications.

The present series of evaluations were made with the mixtures prepared as described in Example II. In all cases the concentration of total additive was 10% but the chlorine:phosphorus ratios were varied from 12:1 to 60:1.

Run No. 5 in the following table is a run which was made with the lubricating oil free of additive and thus is the blank or control run.

which then are recorded on a continuous chart recorder.

Run No. 10 in the following table is a run made with the gear oil containing 10% by weight of the mixture prepared as described in Example I having a chlorine:phosphorus ratio of 24:1.

TABLE II

| Run No. | Temperature, °F. | | | | | Torque, lbs. | | | | | Wear, teeth | | | | | Total time at 1,100 lbs. mins. | Temperature, °F. |
|---|---|---|---|---|---|---|---|---|---|---|---|---|---|---|---|---|---|
| | 250 | 500 | 750 | 1,000 | 1,100 | 250 | 500 | 750 | 1,000 | 1,100 | 250 | 500 | 750 | 1,000 | 1,100 | | |
| 5 | 194 | 290-S | | | | 6-8 | 14-S | | | | 0 | 0-S | | | | | |
| 6 | 225 | 294 | 347 | 395 | 408 | 6-7 | 12-15 | 16-18 | 21-20 | 18-22 | 0 | 2 | 3 | 4 | 21 | 45 | 408 |
| 7 | 203 | 285 | 343 | 389 | 415 | 6-7 | 12-15 | 16-17 | 19-20 | 17-21 | 0 | 1 | 3 | 5 | 16 | 45 | 415 |
| 8 | 199 | 283 | 337 | 378 | 383 | 6-8 | 12-15 | 16-17 | 19-21 | 17-20 | 0 | 2 | 4 | 4 | 12 | 45 | 383 |
| 9 | 183 | 269 | 324 | 366 | 358 | 5-6 | 11-14 | 15-16 | 18-20 | 15-19 | 0 | 2 | 3 | 5 | 14 | 45 | 358 |

NOTE.—S=Seizure.

Run No. 6 is a run made using a mixture having a chlorine:phosphorus ratio of 12:1 and consisted of 7.05% by weight of the reaction product and 2.95% by weight of the salt.

Run No. 7 was made using the mixture having a chlorine:phosphorus ratio of 24:1 and consisted of 8.27% by weight of the reaction product and 1.73% by weight of the salt.

Run No. 8 was made with the mixture having chlorine:phosphorus ratios of 48:1 and consisted of 9.05% by weight of the reaction product and 0.95% by weight of the salt.

Run No. 9 was made with the mixture having a chlorine:phosphorus ratio of 60:1 and consisted of 9.22% by weight of the reaction product and 0.78% by weight of the salt.

Here again it will be noted that the mixtures of the present invention were effective at 1100 pounds for the full duration of the 45 minutes of evaluation. In contrast, the oil without additive underwent seizure at 500 pounds.

EXAMPLE VIII

Another advantage of the mixture of the present invention is that it is of high thermal and hydrolytic stability. This is demonstrated by the evaluations reported in the present example in which the mixture prepared as described in Example I and having a chlorine:phosphorus ratio of 24:1 was evaluated in a commercial gear oil to determine the coefficient of boundary friction. This evaluation was made in a modified Bowden-Leben pin and disc machine. The Bowden-Leben method is described in "The Friction and Lubrication of Solids," 1954, page 74, by Bowden and Tabor. This method is also discussed in the article by E. Rabinowicz, entitled "The Boundary Friction of Very Well Lubricated Surfaces," which was presented at the A.S.L.E. Ninth Annual Meeting in Cincinnati on Apr. 5, 1954, and published in the July-August 1954 issue of "Lubricating Engineering." In the modification used for the run reported herein, a highly polished steel disc rotates in contact with an upwardly extended rounded steel pin. The pin and disc then are immersed in a pan containing the oil to be evaluated. The equipment is enclosed in a housing which is heated for varying the temperature of the run which, in this experiment, ranged from 100° to 350° F. The equipment also includes a variable speed reducer for varying the r.p.m. of the disc and also means for varying the load. In each run the wear or break-in period consists of gradually increasing the speed to 196 r.p.m. at 2000 g. load and decreasing the speed to 12 r.p.m. after which the speed is increased to 196 r.p.m. The load varies from 500 g. to 2000 g. and the coefficient of friction was determined at r.p.m.'s decreasing from 196 to 0.1. A strain gage circuit is used as sensing element in converting the frictional effects into equivalent electrical responses

TABLE III

| | Run 10 | | | |
|---|---|---|---|---|
| Speed, r.p.m.: | 100° F. | 200° F. | 275° F. | 350° F. |
| 196 | 0.073 | 0.082 | 0.082 | 0.070 |
| 175 | 0.075 | 0.088 | 0.085 | 0.074 |
| 155 | 0.077 | 0.092 | 0.085 | 0.072 |
| 137 | 0.080 | 0.095 | 0.085 | 0.070 |
| 110 | 0.082 | 0.098 | 0.085 | 0.068 |
| 88 | 0.085 | 0.104 | 0.087 | 0.062 |
| 65 | 0.087 | 0.104 | 0.093 | 0.057 |
| 47 | 0.090 | 0.102 | 0.097 | 0.055 |
| 35 | 0.092 | 0.100 | 0.098 | 0.053 |
| 23 | 0.097 | 0.098 | 0.102 | 0.950 |
| 12 | 0.102 | 0.105 | 0.115 | 0.034 |
| 6 | 0.109 | 0.112 | 0.114 | 0.024 |
| 3 | 0.109 | 0.121 | 0.110 | 0.020 |
| 1 | 0.104 | 0.134 | 0.117 | 0.015 |
| 0.25 | 0.100 | 0.127 | 0.110 | 0.009 |
| 0.1 | 0.098 | 0.127 | 0.104 | 0.007 |

From the data in the above table, it will be seen that the mixture of the present invention has high stability and imparts low coefficients of friction to the oil. These properties indicate that the additive would be effective for limited slip differential applications.

EXAMPLE IX

In order to determine whether the addition of water would be harmful, another evaluation was made in the same manner as described in Example VIII except that 1% by weight of water was added to the used oil after evaluation as described in Example VIII and additional evaluation then was made on the used oil and these results are reported in the following table.

The run reported in the following table was made with the oil containing the mixture prepared as described in Example I and corresponds to the run reported in Example VIII.

TABLE IV

| | Run 11 | | | |
|---|---|---|---|---|
| Speed, r.p.m.: | 100° F. | 200° F. | 275° F. | 350° F. |
| 196 | 0.079 | 0.060 | 0.066 | 0.062 |
| 175 | 0.082 | 0.062 | 0.072 | 0.060 |
| 155 | 0.084 | 0.060 | 0.075 | 0.060 |
| 137 | 0.085 | 0.062 | 0.080 | 0.058 |
| 110 | 0.085 | 0.063 | 0.082 | 0.055 |
| 88 | 0.088 | 0.065 | 0.084 | 0.053 |
| 65 | 0.090 | 0.067 | 0.084 | 0.050 |
| 47 | 0.092 | 0.070 | 0.080 | 0.047 |
| 35 | 0.093 | 0.072 | 0.074 | 0.043 |
| 23 | 0.095 | 0.079 | 0.070 | 0.038 |
| 12 | 0.091 | 0.077 | 0.053 | 0.035 |
| 6 | 0.090 | 0.098 | 0.044 | 0.026 |
| 3 | 0.090 | 0.109 | 0.040 | 0.021 |
| 1 | 0.102 | 0.100 | 0.036 | 0.014 |
| 0.25 | 0.110 | 0.075 | 0.028 | 0.008 |
| 0.1 | 0.112 | 0.058 | 0.028 | 0.008 |

It will be seen that the mixture of the present invention was effective in the presence of water and therefore is highly desirable in case water should become entrained in the lubricating oil.

EXAMPLE X

As hereinbefore set forth, a synergistic effect was obtained when using a mixture of the components as compared to the use of each component separately. This is demonstrated by the data in the present example which compares the use of (1) the reaction product as prepared in substantially the same manner as described in Example I and (2) the mixed mono and di-isooctyl acid orthophosphates of N-tallow-1,3-diaminopropane. Two different mixtures of reaction product and salt were prepared to have chlorine:phosphorus ratios of 36:1 and 48:1 respectively.

The data reported in the following table were run in the Falex machine as described in Example VI hereinbefore.

Run 12 in the table is a run made using 10% by weight of the reaction product.

Run 13 in the table is a run made using 10% by weight of the phosphate salt.

Run 14 in the table is a run made using a mixture of 9.1% by weight of the reaction product and 0.9% by weight of the phosphate salt of the mixture having a chlorine:phosphorus ratio of 36:1. It will be noted that the total additive concentration is 10% by weight.

Run 15 is a run made using a mixture of 9.3% by weight of the reaction product and 0.7% by weight of the phosphate salt of the mixture having a chlorine:phosphorus ratio of 48:1. Here again it will be noted that the total additive concentration is 10% by weight.

Referring to the data in Table V, it will be noted that Run 12 (10% by weight of the reaction product) was somewhat effective but does show a rapid increase in temperature, high torque and high teeth wear at a load of 1000 pounds, thus showing a lowering of lubricating properties. Run 13 (10% by weight of the phosphate salt) underwent seizure at a load of 1250 pounds. In contrast, Runs 14 and 15 (mixtures of the present invention) did not undergo seizure until a load of 1500 pounds. This demonstrates a desirable improvement in the lubricating properties of the mixture as compared to the use of either component alone. As hereinbefore set forth, this improvement could not be predicted and was discovered only by actually evaluating the mixtures, thus showing an unobvious result.

EXAMPLE XI

As a further demonstration of the synergistic effect, a similar comparison as set forth in Example X was made in which the phosphate salt was the mixed mono and ditridecyl acid orthophosphates of oleyl amine. In other words, the amine used was a long chain alkyl monoamine, whereas the amine used in Example X was an N-alkyl-diaminoalkane in preparing the phosphate salt.

The data in the following table were obtained in the same manner as described in Example X.

Run 12 is the same as run 12 in Example X.

Run 16 is a run made using 10% by weight of the mono- and ditridecyl acid orthophosphates of oleyl amine.

Run 17 is a run made using a mixture of 6.84% by weight of the same reaction product used in Run 12 and 3.16% by weight of the phosphate salt used in Run 16, the mixture having a chlorine:phosphorus ratio of 12:1. It will be noted that the total additive concentration is 10% by weight.

Run 18 is a run using a mixture of 8.13% by weight of the same reaction product and 1.87% by weight of the above phosphate salt, the mixture having a chlorine:phosphorus ratio of 24:1. Here again it will be noted that the total additive concentration is 10% by weight.

Run 19 is a run using a mixture of 9.05% by weight of the same reaction product and 0.95% by weight of the above phosphate salt, the mixture having a chlorine:phosphorus ratio of 48:1. Again it will be noted that the total additive concentration is 10% by weight.

The results of the runs described above are reported in the accompanying Table VI.

TABLE V

| Run No. | Composition, wt. percent | | Ratio Cl/P | Temperature, °F. | | | | | | | Torque, in. lbs. | | | | | | | Wear, teeth | | | | | | | MFST seizure conditions | | |
|---|---|---|---|---|---|---|---|---|---|---|---|---|---|---|---|---|---|---|---|---|---|---|---|---|---|---|---|
| | Reaction product | Phosphate salt | | 250 | 500 | 750 | 1,000 | 1,250 | 1,500 | | 250 | 500 | 750 | 1,000 | 1,250 | 1,500 | | 250 | 500 | 750 | 1,000 | 1,250 | 1,500 | | Load, lbs. | Time, min. | Temp., °F |
| 12 | 10.0 | | (1) | 209 | 269 | 350 | 540 | | | | 7-9 | 12-15 | 16-28 | 36-60 | | | | 0 | 2 | 2 | 28 | | | | 1,000 | 5 | 540 |
| 13 | | 10.0 | (2) | 190 | 277 | 327 | 363 | 482-S | | | 6-8 | 13-16 | 17-20 | 20-22 | 25-S | | | 0 | 0 | 5 | 7 | 4-S | | | 1,250 | 1.4 | 484 |
| 14 | 9.1 | 0.9 | 36 | 185 | 277 | 330 | 370 | 425 | 455-S | | 6-7 | 11-13 | 16-18 | 20-21 | 22-25 | 30-S | | 0 | 2 | 2 | 2 | 10 | 0-S | | 1,500 | 0.1 | 455 |
| 15 | 9.3 | 0.7 | 48 | 197 | 272 | 338 | 370 | 412 | 470-S | | 7-8 | 12-14 | 18-20 | 20-22 | 22-24 | 28-S | | 0 | 0 | 2 | 2 | 7 | 2-S | | 1,500 | 0.6 | 470 |

¹ All Cl.  ² All P.
Note.—S=Seizure.

TABLE VI

| Run No. | Composition, wt. percent | | Ratio Cl/P | Temperature, °F. | | | | | | | Torque, in. lbs. | | | | | | | Wear, teeth | | | | | | | MFST seizure conditions | | |
|---|---|---|---|---|---|---|---|---|---|---|---|---|---|---|---|---|---|---|---|---|---|---|---|---|---|---|---|
| | Reaction product | Phosphate salt | | 250 | 500 | 750 | 1,000 | 1,250 | 1,500 | | 250 | 500 | 750 | 1,000 | 1,250 | 1,500 | | 250 | 500 | 750 | 1,000 | 1,250 | 1,500 | | Load, lbs. | Time, min. | Temp., °F. |
| 12 | 10.0 | | (1) | 209 | 269 | 350 | 540 | | | | 7-9 | 12-15 | 16-18 | 36-60 | | | | 0 | 2 | 2 | 28 | | | | 1,000 | 5 | 540 |
| 16 | | 10.0 | (2) | 174 | 286 | 335 | 378 | 410-S | | | 6-9 | 15-18 | 19-22 | 20-25 | 26-S | | | 0 | 0 | 6 | 7 | 7-S | | | 1,250 | 1.7 | 410 |
| 17 | 6.84 | 3.16 | 12 | 193 | 279 | 335 | 383 | 415 | 515-S | | 6-8 | 13-15 | 17-19 | 20-22 | 24-27 | 32-S | | 0 | 2 | 2 | 3 | 8 | 2-S | | 1,500 | 0.4 | 515 |
| 18 | 8.13 | 1.87 | 24 | 185 | 268 | 328 | 360 | 398 | 500-S | | 7-8 | 12-15 | 17-18 | 19-21 | 22-23 | 25-S | | 0 | 1 | 1 | 4 | 4 | 4-S | | 1,500 | 1.8 | 500 |
| 19 | 9.05 | 0.95 | 48 | 205 | 270 | 323 | 362 | 409 | 475-S | | 7-8 | 12-14 | 16-17 | 18-20 | 21-23 | 30-S | | 0 | 1 | 2 | 4 | 4 | 0-S | | 1,500 | 0.9 | 475 |

¹ All Cl.  ² All P.
Note.—S=Seizure.

Referring to the data in Table VI, it will be noted that Run 12, although somewhat effective, shows a rapid increase in temperature, high torque and high teeth wear at a load of 1000 pounds. As mentioned above, this indicates a lowering of the lubricating properties of the oil. Run 16 (10% of the phosphate salt) underwent seizure at a load 1250 pounds. In contrast, the runs using the mixtures of the present invention did not undergo seizure until a load of 1500 pounds. This again demonstrates the synergistic effect obtained by using a mixture of the components and, as hereinbefore set forth, could not have been predicted but was discovered by only actually evaluating the mixtures.

EXAMPLE XII

The mixture prepared as described in Example I and having a chlorine:phosphorus ratio of 6:1 is used in a concentration of 1% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently the grease is cooled, while agitating, to approximately 250° F. and then the grease is further cooled slowly to room temperature.

The stability of the grease is tested in accordance with ASTM D942 method, in which method a sample of the grease is placed in a bomb and maintained at a temperature of 250° F. Oxygen is charged to the bomb, and the time required for a drop of 5 pounds pressure is taken as the Induction Period. A sample of the grease without additive will reach the Induction Period in about 8 hours. On the other hand, a sample of the grease containing 1% by weight of the additive will not reach the Induction Period for more than 100 hours.

We claim as our invention:

1. Synergistic mixture of (1) the product formed by the reaction, at a temperature of from about 10° to about 280° C., of from 1 to 2 mole proportions of amino compound and one mole proportion of polyhalopolyhydropolycyclicdicarboxylic acid or anhydride and (2) salt of alkyl acid orthophosphate and amino compound, the amino compounds of (1) and (2) being independently selected from the group consisting of long chain alkyl monoamine and N-alkyldiaminoalkane containing from about 8 to about 26 carbon atoms in said alkyl and from about 2 to about 6 carbon atoms in said alkane.

2. The mixture of claim 1 wherein said acid or anhydride is 5,6,7,8,9,9 - hexachloro - 1,2,3,4,4a,5,8,8a - octahydro - 5,8 - methano - 2,3 - naphthylenedicarboxylic acid or anhydride.

3. The mixture of claim 1 wherein said long chain alkyl monoamine contains from about 8 to about 26 carbon atoms.

4. The mixture of claim 3 wherein said monoamine is a fatty acid amine.

5. The mixture of claim 4 wherein said fatty acid amine is oleyl amine.

6. The mixture of claim 4 wherein said fatty acid amine is stearyl amine.

7. The mixture of claim 1 wherein said N-alkyl-diaminoalkane is N-alkyl-1,3-diaminopropane.

8. The mixture of claim 1 wherein said alkyl acid orthophosphate comprises mixed mono and dialkyl acid orthophosphates in which at least one alkyl group contains from about 6 to about 20 carbon atoms.

9. An organic substrate normally subject to deterioration in storage or use containing a stabilizing concentration of the additive of claim 1.

10. The organic substrate of claim 9 being a lubricant comprising a major proportion of an oil of lubricating viscosity.

11. The organic substrate of claim 10 being lubricating oil.

References Cited

UNITED STATES PATENTS

| | | | |
|---|---|---|---|
| 2,683,691 | 7/1954 | Thorpe et al. | 252—32.5 |
| 2,882,228 | 4/1959 | Watson et al. | 252—32.5 |
| 3,063,820 | 11/1962 | Chenicek | 252—32.5 |
| 3,088,911 | 5/1963 | Staffin et al. | 252—34 |
| 3,169,923 | 2/1965 | Guarnaccio et al. | 252—32.5 |
| 3,205,170 | 9/1965 | Pollitzer et al. | 252—32.5 |
| 3,208,939 | 9/1965 | Latos et al. | 252—51.5 |
| 3,238,132 | 3/1966 | Cyba | 252—32.7 |
| 3,251,771 | 5/1966 | Benoit | 252—32.7 |
| 3,336,237 | 8/1967 | Malone et al. | 252—32.5 |
| 3,362,906 | 1/1968 | Cyba | 44—71 |

DANIEL E. WYMAN, Primary Examiner

I. VAUGHN, Assistant Examiner

U.S. Cl. X.R.

252—8.1, 400; 260—45.8; 424—224